(12) United States Patent
Inohara et al.

(10) Patent No.: US 6,385,606 B2
(45) Date of Patent: May 7, 2002

(54) FILE FORMAT CONVERSION METHOD, AND FILE SYSTEM, INFORMATION PROCESSING SYSTEM, ELECTRONIC COMMERCE SYSTEM USING THE METHOD

(75) Inventors: Shigekazu Inohara, Kokubunji; Toyohiko Kagimasa, Yokohama; Fumio Noda, Kodaira; Yoshimasa Masuoka, Kodaira; Jinghua Min, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/756,231

(22) Filed: Jan. 9, 2001

Related U.S. Application Data

(62) Division of application No. 09/179,092, filed on Oct. 27, 1998.

(30) Foreign Application Priority Data

Oct. 27, 1997 (JP) .............................................. 9-293765

(51) Int. Cl.$^7$ .............................................. G06F 17/30
(52) U.S. Cl. .............................. 707/4; 707/2; 707/101; 707/200
(58) Field of Search ................................. 707/101, 200, 707/4, 2, 10

(56) References Cited

U.S. PATENT DOCUMENTS

| | | | | |
|---|---|---|---|---|
| 5,675,507 A | * | 10/1997 | Bobo, II | 709/206 |
| 5,708,828 A | * | 1/1998 | Coleman | 707/523 |
| 5,802,511 A | * | 9/1998 | Kouchi et al. | 707/2 |
| 6,023,694 A | * | 2/2000 | Kouchi et al. | 707/2 |
| 6,026,392 A | * | 2/2000 | Kouchi et al. | 707/2 |
| 6,212,550 B1 | * | 4/2001 | Segur | 709/206 |

FOREIGN PATENT DOCUMENTS

| | | |
|---|---|---|
| JP | 6187219 | 7/1994 |
| JP | 9069059 | 3/1997 |

OTHER PUBLICATIONS 4.4 BSD User's Reference Manual, Mar. 19, 1994, pp. 1–8.

* cited by examiner

*Primary Examiner*—Paul R. Lintz
(74) *Attorney, Agent, or Firm*—Antonelli, Terry, Stout & Kraus, LLP

(57) ABSTRACT

In order to perform format conversion between the formats of a plurality of files without any work by a user, a file system stores a relation between a conversion originating file and a conversion destination file, and synchronously with an issue of a file operation API, the format conversion processes are executed. A user performs only the tasks essential for an application, without taking into consideration various necessary format conversions (either one-step or multi-step). During the user task, it is not necessary to designate a conversion originating file and a timing of format conversion. A user can use always a latest conversion destination file.

22 Claims, 12 Drawing Sheets

FIG. 2

120 CONVERSION TABLE

| CONVERSION ORIGINATING FORMAT 201 | CONVERSION DESTINATION FORMAT 202 |
|---|---|
| CONVERSION PROGRAM 203 ||

⎿ 200 CONVERSION TABLE ENTRY

121 NAME SPACE TABLE

| FILE NAME 211 | FILE ID 212 |
|---|---|

⎿ 210 NAME SPACE TABLE ENTRY

122 FILE TABLE

| FILE ID 221 | FORMAT 222 | TIME STAMP 223 |
|---|---|---|
| CONVERSION ORIGINATING ID 224 | TOKEN ID 225 | FILE CONTENT 226 |

⎿ 220 FILE TABLE ENTRY

123 TOKEN TABLE

| TOKEN ID 231 | FILE ID 232 | MODE 233 |
|---|---|---|

⎿ 230 TOKEN TABLE ENTRY

124 DELETION CANDIDATE TABLE

| FILE ID 241 |
|---|

⎿ 240 DELETION CANDIDATE TABLE ENTRY

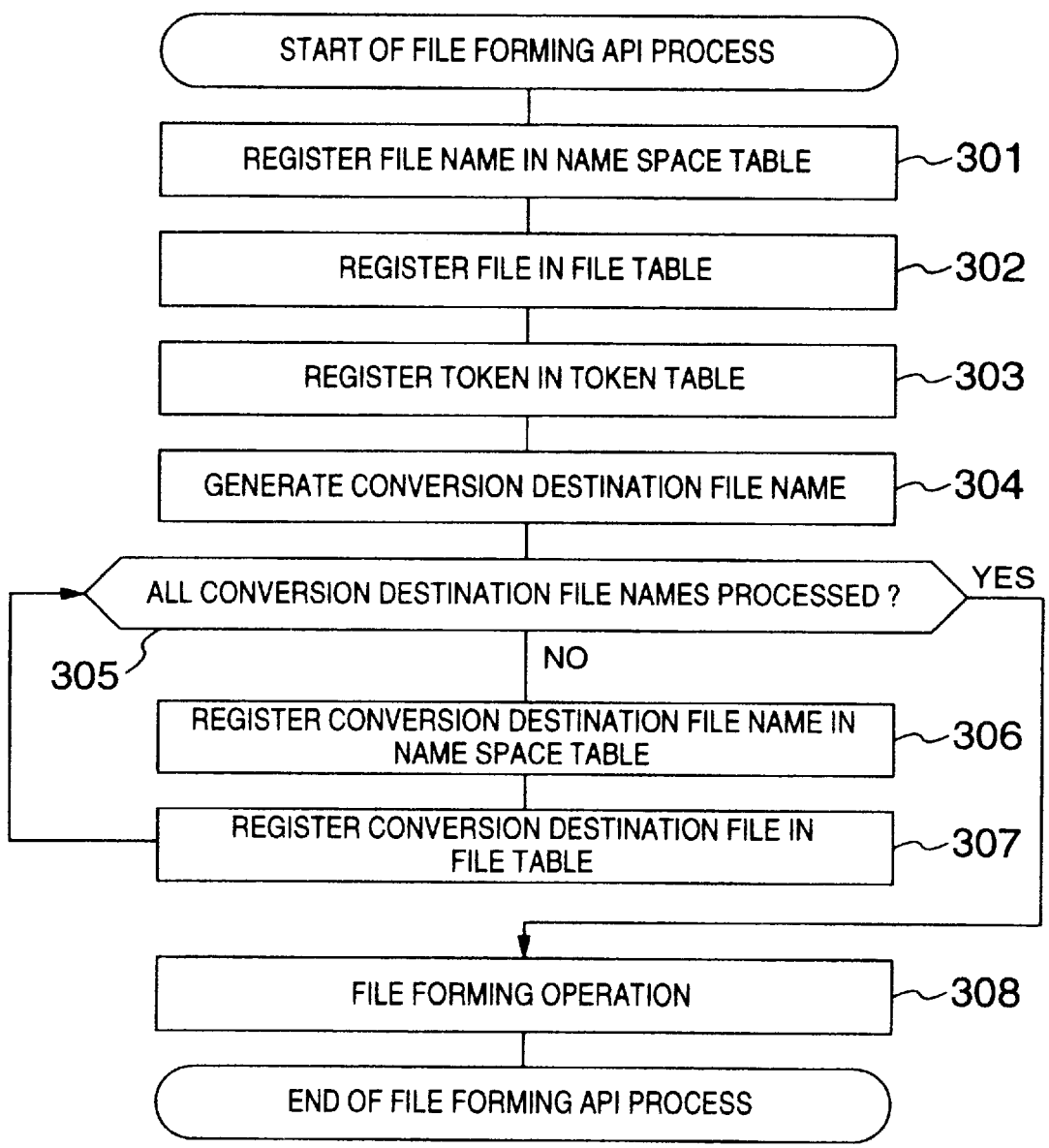

FILE FORMAT CONVERSION METHOD, AND FILE SYSTEM, INFORMATION PROCESSING SYSTEM, ELECTRONIC COMMERCE SYSTEM USING THE METHOD

This is a divisional application of Ser. No. 09/179,092, filed Oct. 27, 1998.

BACKGROUND OF THE INVENTION

The present invention relates to a computer system, and more particularly to a file format conversion method for a file system which provides a user with information having a plurality of file formats. More specifically, the invention relates to a file format conversion method suitable for a plurality of computers to exchange over the world wide web (hereinafter called WWW) information having a plurality of file formats, and to a file system, various information processing systems, and an electronic commerce system respectively using the file format conversion method.

Prior to describing the related art, some terms will be described.

A computer system uses a "secondary storage unit" for preserving data even if the power of the computer is turned off. The secondary storage unit presently used is a hard disk, a floppy disk, a magneto-optical disk, or the like.

A "file system" is software used for data exchange between a secondary storage unit and an application program ("application"). The unit of data a file system processes is called a "file". Generally, a plurality of files are stored in one secondary storage unit, and each file is discriminated by a "file name". A character string is often used as the file name. A file system is supplied in many cases to a user as part of an operating system (OS), or it is supplied in some cases as a combination of libraries and an OS or only as libraries. For example, software combining a file system supplied by an OS and a library adding an extension function to the file system is called a file system so long as it processes data exchange between a secondary storage unit and an application.

A file operation an application program (application) can perform is defined by an application program interface (API) between the application and file system. An API regarding a file input/output is called a "file input/output API". The file input/output API includes an open (preparation for file read/write), a read (transfer of data from a file to an application), a write (transfer of data from an application to a file), and a close (end of file read/write). An API regarding the operation of a file and a directory is called a "file management API". The file management API includes file formation, file name change, and file deletion. The file operation which can be realized by the file input/output API and file management API is collectively called a "file operation".

The data structure of a file is called a "file format" (or simply "format"). Examples of the format include "array of character strings partitioned by a line feed character", "array of items partitioned by a tab character", "file format of word processor software A", "array of frames (an image displayed at an instant) of a moving image", and the like. The file format is represented in some cases by using last several characters of a file name. The last several characters of the file name are called an "extension".

The related art will be described below.

A file presently used by a number of applications (such as a word processor, a spread sheet, a schedule management, an e-mail, and a programming tool) has a format specific to it. A personal computer widely used nowadays utilizes a variety of file formats totalling in number about 200. In the WWW prevailed upon developments of the Internet, not only characters, but also still images, moving images, sound, computer graphics are used with a various kind of file formats.

Generally, not all applications can access all file formats. Therefore, even if a user stores information in a file having a certain file format, the user is often required to perform a "file conversion" for the file in order to enable another application to access the file. A file as an input for the format conversion is called a "conversion originating file", and a file as an output is called a "conversion destination file".

The format conversion requires the tasks of (1) selecting a conversion program (or a combination of conversion programs) for performing a conversion desired by a user, from a number of "conversion programs" regarding a various kind of formats, and (2) correctly giving the selected conversion program with a conversion originating file and a conversion destination file and executing the conversion program at a proper timing. These tasks are not relevant to the works of a user performed on an application. It is therefore desired that a format conversion load on the user is reduced as much as possible. As described above, since the utilization of the Internet and WWW are rapidly increasing, there is a high need of processing a variety kind of formats as simply as possible.

The following methods have been proposed heretofore in order to simplify mainly the above task (1).

In JP-A-6-187219, "Automatic Data Sharing Method between Programs" (hereinafter called Prior Art 1), a user designates an application and a file to be used, an application—data correspondence table is searched to select a proper conversion program, and the application performs the format conversion necessary for using the file.

The user is therefore released from the task (1), i.e., selecting a conversion program used for accessing the file. However, the task (2), i.e., designating that when the format conversion is performed for what file, is still required to be operated by the user. The reason for this is that a user is required to perform a work of designating and supplying the file to be converted and the application name to the system of Prior Art 1, although this work is not relevant to the essential work of the user to be performed on the application.

In a present computer system including the WWW, one application processes a plurality of file formats, and there are a plurality of applications which process only one file format. Under such circumstances, even if the application and the file name are designated, a particular conversion method cannot be determined. For example, consider the case there are three file formats discriminated by three extensions .tex, .ps, and .pdf and a program A can process .ps and .pdf. In this case, even if a user designates the program A and a file foo.tex, it is not possible to definitely determine whether foo.tex is converted into foo.ps or foo.pdf.

In JP-A-9-69059, "File Format Conversion System (hereinafter called Prior Art 2), as a user designates a conversion originating file name and a conversion destination file name (or an application name using a conversion originating file and an application name using a conversion destination file), a conversion program or programs are selected, and the format conversion from the conversion originating file into the conversion destination file is executed. Therefore, the user is released from the task (1), i.e., selecting a conversion program or programs to be used for accessing the file. However, the user is required to perform the task (2), i.e., designating that when the format conversion is performed for what file, and this work load is still imposed upon the user.

As a method of automatically and collectively performing complicated file operation processes, software (hereinafter called Prior Art 3) is known which is described in MAKE Paragraph 1 of the document "4.4 BSD User's Reference Manual" written by University of California, Computer Systems Research Group (O'Reilly & Associates, Inc., 1994). Prior Art 3 discloses a method of simplifying a one-step or multi-step compile operation from a source program to a binary program. Also Prior Art (3) can solve the issue of the task (1), but the issue of the task (2) cannot be solved.

As described above, although there are many proposals, the conventional format conversion method does not consider the load of the task (2) upon a user. The task (2) can be further classified into two sub-tasks. (2-a) A task of designating that which file is used as the conversion originating file and which file is used as the conversion destination file. If this designation is missed, there is a danger that the contents of the conversion destination file become different from those the user desired, and that the contents of another file may be broken. It is necessary to pay attention to that there is a case wherein a conversion destination file is not present before the format conversion. (2-b) A task of designating that when the format conversion is executed. If this designation is missed, there is a danger that an application accesses old information.

Further, the conventional format conversion method has the following problems.
(i) A method of retaining a consistency between a conversion originating file and a conversion destination file is not prepared. There is therefore a risk that a write operation starts generally at the same time for both the conversion originating file and conversion destination file, and the next format conversion makes one of the written files be lost, or other risks.
(ii) Since a number of conversion destination files are stored, an additional secondary storage area may become necessary.
(iii) The format conversion is impossible if the conversion originating file cannot be accessed, (for example, because an application is editing the conversion originating file, because the power of the secondary storage unit storing the conversion originating file is turned off, or because of other reasons).

SUMMARY OF THE INVENTION

It is an object of the present invention to solve the problems associated with the tasks (1), (2-a), and (2-b) and the problems (i), (ii), and (iii) and reduce the works of a user utilizing a plurality of file formats as much as possible, in view of the present conditions that a plurality of file formats are used by a plurality of applications.

The problem associated with the task (2-1) results from that there are a number of conversion originating and destination files and a relation among them is not given as yet. Therefore, a user is required to instruct that the format of which file is converted into the format of which file. According to the invention, a file system holds a relation (either one-step or multi-step) among a conversion originating file, a conversion destination file, and a conversion file. With this means, not only the format of a conversion originating file can be converted into the format of a conversion destination file by using only the conversion destination file, but also it is possible to obtain one or more conversion destination files and one or more conversion programs by using only a conversion originating file.

In order to deal with the case wherein a conversion destination file is not present before the file conversion, the file system is provided with a file name conversion method of obtaining the file name of a conversion destination file from the file name of a conversion originating file. The conversion destination file is ordinarily generated as the result of the format conversion. According to the invention, the format conversion can start upon designation of a conversion destination file so that the works of a user can be reduced. Namely, a problem that which one of the format conversion and conversion destination file was first formed cannot be known, can be solved by providing the file name conversion method, so that the conversion destination file can be supplied to a user before the format conversion is performed.

The problem associated with the task (2-b) results from that there is no means for providing a coordination between an application and a format conversion method, i.e., there is no means for the format conversion method to know when and how an application processes which file. Therefore, a user is required heretofore to perform a setup process of the format conversion in addition to the works of the user to be performed on an application. In contrast, according to the invention, the file system sets up and executes a conversion program, by using as a trigger the issue of a file input/output API entered by a user.

With the provision of the above two counter-measures, the format conversion method of the invention can know that which file an application processes and whether the access is a read or write operation. Therefore, a user is required to perform only the essential works of an application, and various format conversions (either one-step or multi-step) which become necessary during the user works can be performed without involving the user in the format conversions. Since the conversion program is executed by using as a trigger the file operation, it is not necessary to designate the timing of the format conversion, and a user can always access the latest conversion destination file.

Furthermore, according to the invention, in order to solve the above problems (i), (ii), and (iii), the following means (I), (II), and (III) are provided.

(I) An exclusive control is performed between an execution of a file input/output API for a conversion originating file and an execution of a file input/output API for a conversion destination file. Namely, while one of them is executed, the other is inhibited to be executed. A consistency between the conversion originating and destination files can therefore be retained.

(II) In order to avoid a wasteful secondary storage area to be caused by storing a number of conversion destination files, conversion destination files are deleted when necessary.

(III) In order to allow the format conversion to be executed while a conversion originating file cannot be accessed, an intermediate file is provided, and a two-step conversion is preformed to convert from a conversion originating file into an intermediate file and convert the intermediate file into a conversion destination file.

The file system receives various operation requests for files, and can realize the file conversion using the issue of a file input/output API as its trigger, and the two-step conversion to convert from a conversion originating file into an intermediate file and convert the intermediate file into a conversion destination file. Furthermore, since the file system is shared by a number of applications, by providing the file system with the file format conversion function of the invention, a number of applications can enjoy the effects of the invention.

BRIEF DESCRIPTION OF THE DRAWINGS

FIG. 2 is a diagram showing the data structure used with the first embodiment.

FIG. 3 is a flow chart illustrating the operation of a file forming API.

DETAILED DESCRIPTION OF THE PREFERRED EMBODIMENTS

Embodiments of the invention will be described with reference to the accompanying drawings.

Figure 1:
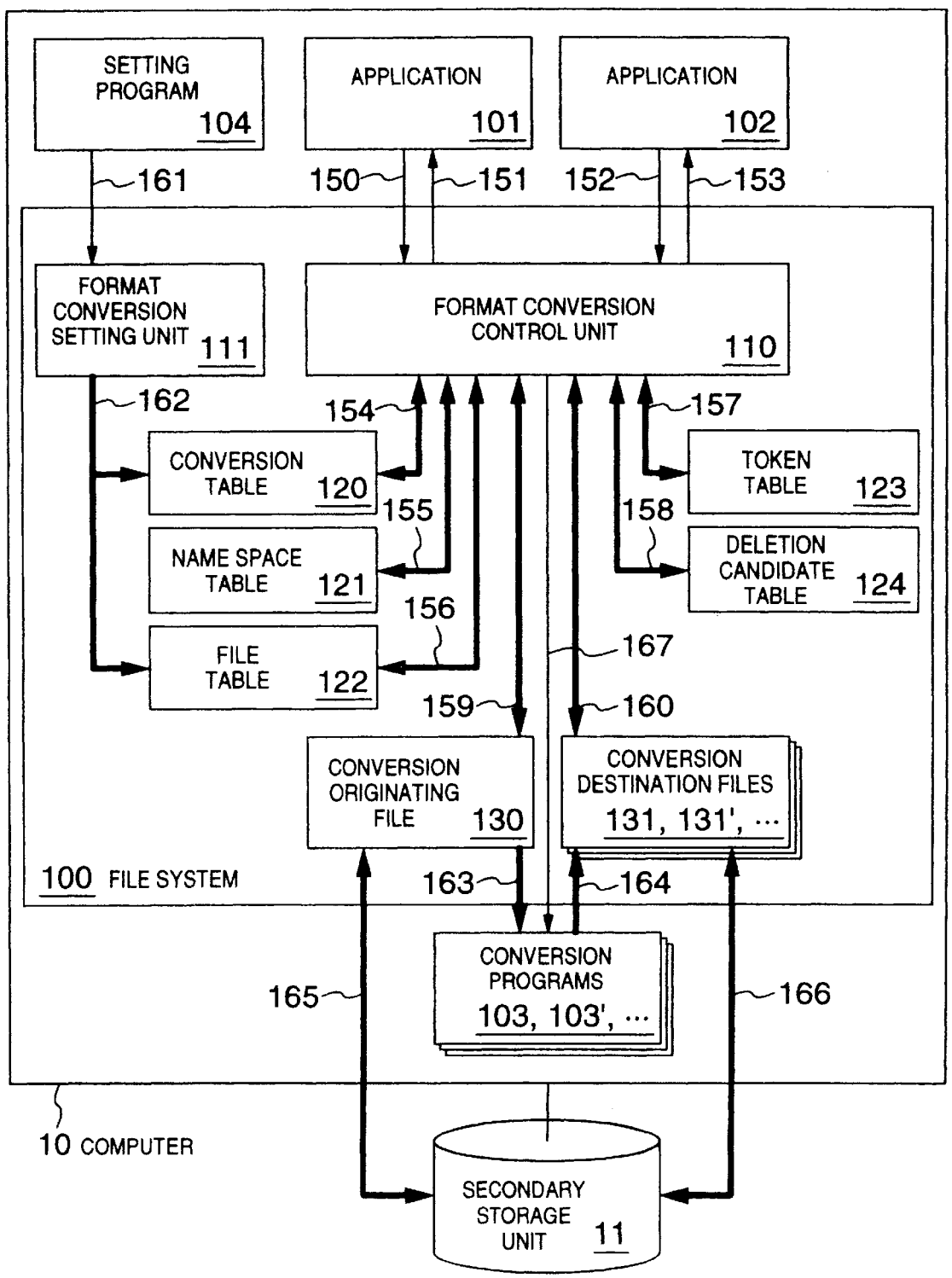
FIG. 1 is a block diagram showing the outline of the internal structure of a first embodiment.

The whole structure of a first embodiment of the invention will be described with reference to FIGS. 1 and 2. In FIG. 1, bold lines with an arrow (154–160, 162–166) indicate a main data flow, and narrow lines with an arrow (150–153, 161, 167) indicate a main control flow.

A computer 10 may be an arbitrary computer such as a personal computer, a work station, a parallel computer, and a main frame computer. A secondary storage unit 11 stores files. As the secondary storage unit 11, a non-volatile storage unit (magnetic hard disks, optical disks and the like) is often used, and in particular cases, a volatile storage unit (main memory, cache memory and the like) is used. Although various types of connections between the computer 10 and secondary storage unit 11 may be thought of, a specific connection type is not necessary so long as files can be supplied to the computer 10. For example, typical connection types include a connection via a proprietary communications line of the computer 10, a connection via a network shared by a plurality of computers, a connection via another computer, and the like. One or more secondary storage units 11 may be used by the computer 10.

A file system 100 is software running on the computer 10. The file system 100 manages and reserves data in the unit called a file. One or more files are stored in the secondary storage unit 11, each file being discriminated by a file name.

Applications 101 and 102 are programs to be executed by a user. A number of applications transfer data to and from the file system in order to process each file. A file operation requested by the application 101, 102 relative to the file system 100 includes a file input/output API and a file management API.

A conversion originating file 130 is a file to be input for format conversion. Conversion destination files 131, 131' . . . are files to be output for format conversion. In the first embodiment, although the conversion originating file 130 and conversion destination files 131, 131' . . . are different files for the clarification of the description, one file may be both the conversion originating file 130 and conversion destination file 131. A plurality of conversion originating files and conversion destination files may be used in FIG. 1.

Conversion programs 103, 103', . . . are used by the file system 100 for the format conversion. In this embodiment, the conversion programs 103, 103', . . . are placed outside of the file system 100 to execute the format conversion. Instead, they may be placed in the file system 100 to execute the format conversion in the file system 100.

A conversion table 120 is a table storing a correspondence between a combination of a conversion originating file, a conversion destination file, and a conversion program. As shown in FIG. 2, the conversion table 120 is constituted of one or more conversion table entries 200 each corresponding to one format conversion. The conversion table entry 200 contains a conversion originating format 201, a conversion destination format 202, and a conversion program 203. The conversion originating format 201 indicates the format of a conversion originating file, and the conversion destination format 202 indicates the format of a conversion destination file. The conversion program 203 indicates a name (if necessary, a setup argument) of the program for converting a conversion originating file having the format indicated by the conversion originating format 201 into a conversion destination file having the format indicated by the conversion destination format 202.

A name space table 121 stores a correspondence between a file name of each file managed by the file system 100 and a file ID used in the file system 100. As shown in FIG. 2, the name space table 121 has one or more name space table entries 210 each corresponding to one file. The name space table entry 210 contains a file name 211 and a file ID 212. The file name 211 indicates the file name of a file of this entry 210, and the file ID 212 indicates the file ID of the file. The file ID is the number of the file used by the file system, and the file ID is in one-to-one correspondence with the file.

A file table 122 stores various parameters of each file managed by the file system 100. The format of a file and (if the file is a conversion destination file) a conversion destination file, are stored in this table. As shown in FIG. 2, the file table 122 has one or more file table entries 220 each corresponding to one file. The file table entry 220 contains a file ID 221, a format 222, a conversion originating file ID 224, a token ID 225, and a file content 226. The file ID 221 indicates an ID of the file corresponding to the file table entry, the format 222 indicates the format of the file, a time stamp 223 indicates a time when last data was written in the file, the conversion originating file ID 224 indicates an ID of a conversion originating file (if the file is the conversion originating file), and the token ID indicates an ID assigned to the file and managed by a token table 123. The file content 226 indicates the main part of the file (i.e., file data of the conversion originating file 130 or conversion destination file 131, 131', . . . ) and the attributes of the file.

Formats to be stored in the conversion originating format 201, conversion destination format 202, and format 222 may be represented by various notations. The invention does not depend on this notation method. For example, in a computer system in which an extension represents the format of a file, the extension may be stored. In the case where the format is determined in accordance with part or the whole of the file contents 226, different format names for respective formats may be stored. In the first embodiment, it is assumed that the extension is stored in the conversion originating format 201, conversion destination format 202, and format 222.

The token table 123 manages tokens each being assigned to a conversion originating file and conversion destination files convertible from the conversion originating file. As shown in FIG. 2, the token table 123 has one or more token table entries 230 each corresponding to one token. The token table entry 230 contains a token ID 231 and a file ID 232. The token ID 231 is a number for unanimously discriminating the token, and the file ID 232 indicates an ID of the file presently holding the token. A mode 233 indicates a present open mode of the file.

A deletion candidate table 124 stores enumerated conversion destination files, and is used for deleting a conversion destination file for the purpose of reserving an empty area of the secondary storage unit or for other purposes. As shown in FIG. 2, the deletion candidate table 124 has one or more deletion candidate table entries 240 each corresponding to one deletable file. The deletion candidate table entry 240 contains a file ID 241 indicating an ID of a deletable file.

A format conversion control unit 110 shown in FIG. 1 receives a call (API call) for the file input/output API or file management API issued from the application 101, 102, and controls the format conversion (which will be later detailed).

A setting program 104 is a program for providing a format conversion setting unit 111 with a format conversion setting API which is used by a user to set or change the operation of the format conversion to be executed by the file system 100. Upon reception of the format conversion setting API from the user (161), the format conversion setting unit 111 changes the conversion table 120 and file table 122. The format conversion setting API changes the conversion table 120 and file table 122 by referring to the entries 200 and 210 (162).

Any one of the conversion table 120, file table 122, name space table 121, token table 123, and deletion candidate table 124 may be stored in each or both of the main memory and secondary storage units. All of the conversion table 120, file table 122, name space table 121, token table 123, and deletion candidate table 124 may be stored outside of the file system 100. For example, another program may be provided different from that of the file system 100, for making this program perform reference and renewal of part or the whole of the conversion table 120, file table 122, name space table 121, token table 123, and deletion candidate table 124, and making the file system 100 to access each table via this program.

The operation of the first embodiment will be described below. The following three situations are assumed upon which the features of the invention are demonstrated, and will be described sequentially. The three situations include: (1) a first application 101 forms the conversion originating file 130; (2) the first application 101 reads/writes the conversion originating file 130; and (3) a conversion destination file is deleted when an empty space of the second storage unit 11 becomes insufficient. In this embodiment, although only the first and second applications 101 and 102 are used for the simplicity of the description, this number and type of the applications are only illustrative. The number and type of applications may be one, three or more.

(1) Formation of File by Application

The first or second application 101 or 102 requests (150, 152) the file system to form a file, by activating a file forming API of the file system 100 and entering the file name of a first file. In this case, the file system 100 executes the processes illustrated in FIG. 3.

First, the name of the first file is registered in the name space table 121 (155, Step 301). Specifically, a new name space table entry 210 is assigned to the name space table 121, the first file ID not assigned to other files is loaded in the file ID 212, and the first file name is loaded in the file name 211.

Next, the first file is registered in the file table 122 (156, Step 302). Specifically, a new file table entry 220 is assigned to the file table 122, the first file ID is loaded in the file ID 221, a first file format of the first file determined from the file name extension is loaded into the format 222, a current time is loaded in the time stamp 223, "empty" is loaded in the conversion originating file ID 224, the first token ID still not assigned to any token is loaded in the token ID 225, and "empty" is loaded in the main part of the file contents 226 (i.e., conversion originating file 130) (159). In a computer system in which the format of a file cannot be identified unless the file content 226 is determined, for example, "empty" is loaded in the format 222 and later when the file content 226 can be acquired because of the write to the first file or the like, the format is loaded in the format 222.

Next, a token corresponding to the first file is registered in the token table (157, Step 303). Specifically, a new token table entry 230 is assigned to the token table 123, a first token ID is loaded in the token ID 231, and "empty" is loaded in the file ID 232.

Next, one or more conversion destination file names are generated in accordance with the first file name and conversion table 120 (154, Step 304). Specifically, one or more first conversion table entries having the conversion originating format 201 same as the first format are searched from the conversion table entries 200 stored in the conversion table 120. The extension is removed from the first file name of each of the searched first conversion table entries, and replaced by the conversion destination format 202 as the extension of the conversion destination name. This process corresponds to a file name conversion method of the first embodiment.

Next, for each of the generated conversion destination file name (while the judgement at Step 305 is N), the processes of Steps 306 and 307 are executed. Specifically, by a similar method to Step 301, the conversion destination file name is registered in the name space table 121 (155, Step 306), and the conversion destination file is registered in the file table 122 (156, Step 307). In registering the conversion destination table in the file table 122, a new file table entry 220 is assigned to the file table 122, the first ID is loaded in the file ID 221, the first file format determined from the file name extension is loaded in the format 222, "empty" is loaded in the time stamp 223, the first file ID is loaded in the conversion originating file ID 224, the first token IS in the token ID 225, and "empty" is loaded in the main part of the file content 226 (i.e., one of conversion destination files 131, 131', . . . ) (160). If the conversion destination file can be another conversion originating file, i.e., if a multi-step conversion is possible, the file name of the conversion destination file is converted by the file name conversing method, and the obtained file name and file are registered in the name space table 121 and file table 122 by the process described above.

If all the conversion destination names generated at Step 304 are processed (Y at the judgement of Step 305), the remaining file forming process is performed (Step 308). In this process, a disk block is assigned to the secondary storage unit 11, parameters such as a file proprietor, a file access privilege, and a file forming time are set, or other operations are performed in some cases. However, since these operations are well known and are not directly relevant to the features of the present invention, the description thereof will not given further.

Upon completion of the process by the file forming API, the file system 100 returns the result to the first or second application 101 or 102 (151, 153). The result is the file ID (or number indirectly indicating the file ID).

The above operation is to generate a new file according to the first embodiment. As described above, the file system of the first embodiment is provided with the file name conversion method for converting the file name of a conversion originating file into the file name of a conversion destination file. Accordingly, the first file requested by the user by using the file forming API can be formed, and in addition, the file system generates one or more conversion destination files from the first conversion originating file.

In the first embodiment, the name of a conversion destination file is formed by using as a trigger a conversion originating file forming process. The name of the conversion destination file may be formed by using as a trigger a directory display operation or a search operation entered by a user. In this case, a mark indicating that "it is necessary to generate a file name" is attached to the directory of conversion destination file names, and when the directory is later displayed or searched, the actual file name forming operation is performed. In this manner, although the file name forming process is delayed, the conversion originating file can be formed at high speed. The file with the mark indicating that "it is necessary to generate a file name" is searched at a lapse of a predetermined time or at a predetermined time interval to generate the conversion destination file name.

(2) Read/write of File by Application

In reading a first file by the application 101, 102, the first file is opened in a write mode by using an open API, read or written by using a write API or read API, and closed by using a close API. Some computer systems may not be provided with the open and close APIs. Also in such a case, the invention is also applicable on the assumption that the read API and write API perform the open and close operations before and after the operation of the read API and write API, respectively.

Figure 4:
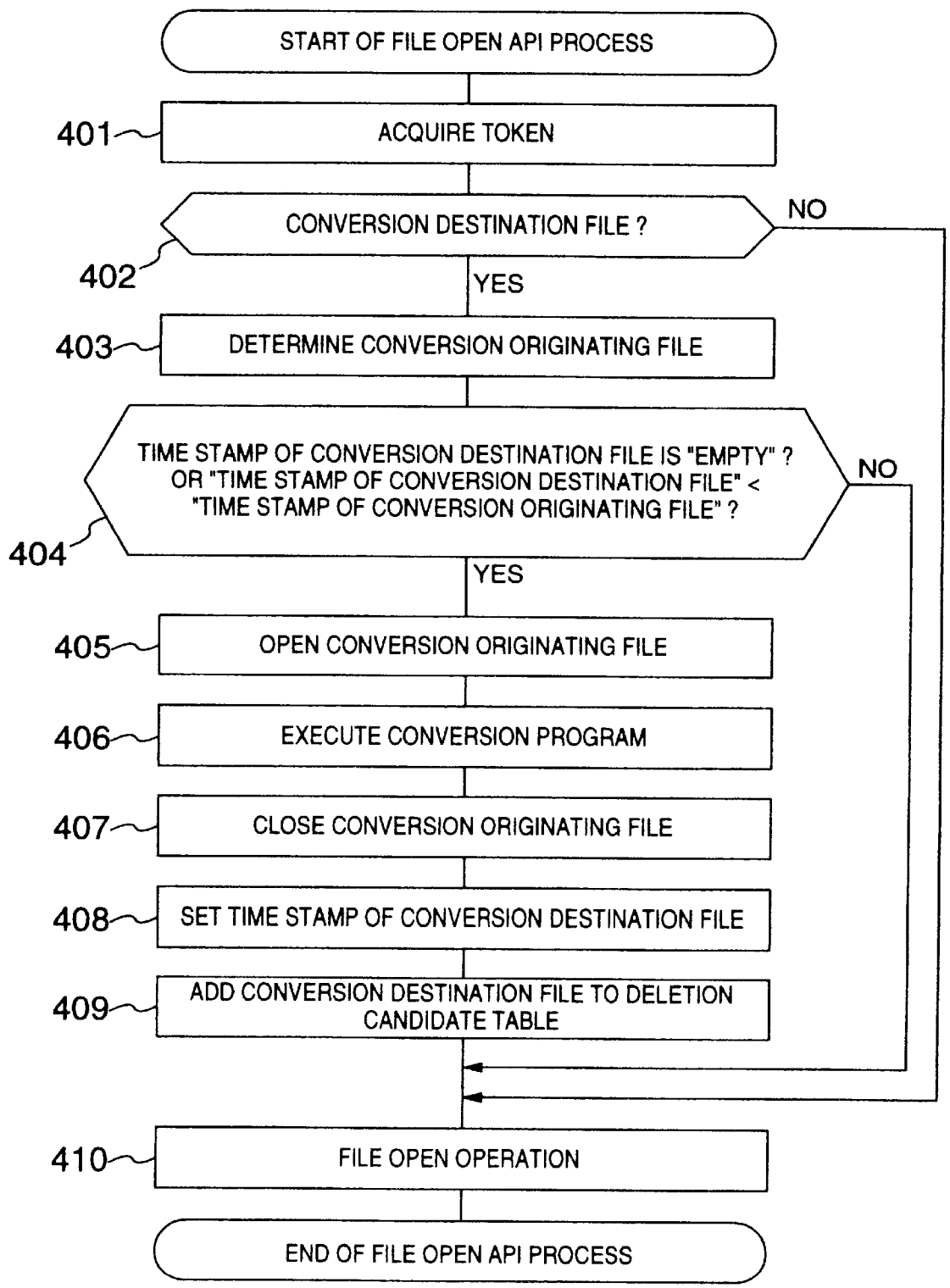
FIG. 4 is a flow chart illustrating the operation of an open API.

The operation of the open API will be described with reference to FIG. 4. The open API of the first embodiment is called from the application 101, 102 by entering the first file name and the open mode (read, write, or both).

First, in order to retain consistency of read/write between the first file and convertible files, a token is acquired (Step 401). Specifically, the name space table entries 210 having the same file name as the file name 211 are searched from the name space table 121 (154), the file table entry 220 having the file ID 221 same as the file ID 212 of the first file name space table entry is searched from the file table (156), and the token table entry 230 having the token ID 231 same as the token ID 225 of the first file table entry is searched from the token table 123 (157). The operation stands by until the file ID 232 of the first file tone table entry becomes "empty", and then the token ID 225 of the first file table entry is loaded in the file ID 232. The open mode is loaded in the mode 233. In this embodiment, although the file operation of files convertible by the token is performed serially, a token acquire/release algorithm may be used for inhibiting simultaneous two or more write APIs (or two or more write open APIS).

Next, it is checked whether the first file is a conversion destination file (Y) or not (N) (Step 402). Specifically, if the conversion originating file ID of the first file table entry is not "empty", the first file is the conversion destination file.

If the judgement at Step 402 indicates that the first file is not the conversion destination file, the flow skips to Step 408 to be later described. If the first file is the conversion destination file, the first conversion originating film of the first file is determined (Step 403). Specifically, the conversion originating file ID 224 of the first file table entry is the file ID of the first conversion originating file. The file table entry 220 having the file ID 221 same as the file ID is searched and used as the second file table entry.

Next, it is checked whether first conversion destination file reflects the latest contents of the first conversion originating file. It is judged that the first file does not reflect the latest contents, if the time stamp 223 of the first file table entry is "empty" or if "the time stamp 223 of the first file table entry"<"the time stamp 223 of the first file table entry" (Y at a judgement of Step 404).

In this case, the conversion originating file is opened (Step 405) and the conversion program is selected and executed (Step 406). Specifically, the conversion table entry 200 is searched having the conversion destination format 202 same as the format 222 of the first file table entry and also having the conversion originating format 201 same as the format 222 of the second file table entry (154, 156), to open the file indicated by the file ID 221 of the second file table entry (Step 405). Then, the conversion program 203 of the first file conversion entry is activated (167, Step 406). In this case, as an input to the conversion program 203, the main part of the file content 226 of the second file table entry is supplied (163), and an output of the conversion program 203 is loaded in the main part of the file content 226 of the first file table entry (164). In this case, if the main part of the file content 226 of the second file entry is not in the file system 100, it is read from the secondary storage unit 11 (169). After the completion of the conversion program 203, the main part of the file content 226 of the first file table entry is written in the second storage unit (166). It is not necessarily required to write the main part of the file content 226 of the first file table entry in the second storage unit. After the conversion, the file indicated by the file ID of the second file table entry is closed by the method to be described later (Step 407).

Then, a current time is set to the time stamp of the conversion destination file (156, Step 408). Specifically, the current time is loaded in the time stamp 223 of the first file table entry.

If it is judged at Step 402 that the time stamp of the conversion destination file is "empty", the conversion destination file is registered in the deletion candidate table 124 (158, Step 409). Specifically, a new deletion candidate table entry 240 is assigned to the deletion candidate table 124, and the file ID 221 of the first file table entry is loaded in the file ID 241 of the deletion candidate table entry.

If a judgement at Step 404 is N, the first file reflects the latest contents of the first conversion originating file, so that the remaining file open operation is performed at Step 410. In this operation, initialization of a file pointer, assignment of a read/write buffer to the main memory, confirmation of file access privilege, and other operations are performed in some cases. However, since these operations are well known and are not directly relevant to the features of the present invention, the description thereof will not further given.

Upon completion of the open API, the file system 100 notifies a completion of the open API to the application which called the open API (151, 153).

Next, the operation of the write API will be described. Similar to a conventional file system, in the write API, an application requests the file system 100 to write data by designating the file name or file ID (or number directly indicating the file ID) (150, 152). In this case, if the file name is designated, the file system 100 acquires the file ID from the name space table 121, similar to the open API (155), whereas if the file ID is designated, the designated ID is used. By using the file ID, the file table entry 220 having the same file ID is searched, and the given data is written in the main part of the file content 226 of the file table entry (156). After completion of the above write API operation, the file system notifies a completion of the write API to the application which called the write API (151, 153).

Next, the read API operation will be described. Similar to a conventional file system, in the read API, an application requests the file system 100 to read data by designating the file name or file ID (or number directly indicating the file ID) (150, 152). In this case, if the file name is designated, the file system 100 acquires the file ID from the name space table 121, similar to the open API (155), whereas if the file ID is designated, the designated ID is used. By using the file ID, the file table entry 220 having the same file ID is searched, and the given data is read from the main part of the file content 226 of the file table entry (156). After completion of the above read API operation, the file system notifies a completion of the read API to the application which called the read API (151, 153).

Figure 5:
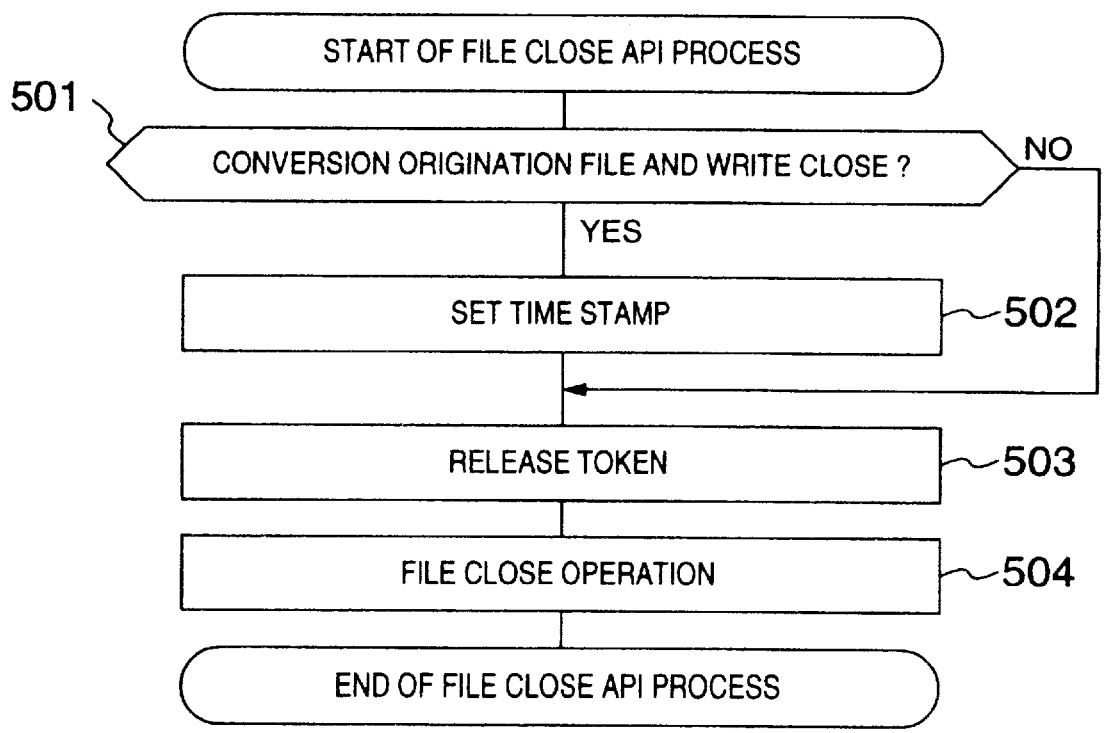
FIG. 5 is a flow chart illustrating the operation of a close API.

Next, the operation of the close API will be described with reference to FIG. 5.

The close API of the first embodiment is called from a application 101, 102 by designating the first file ID of the file opened by the open API (150, 152).

It is checked whether the first file open is the write mode and whether the first file is a conversion originating file (Step 501). Whether the open is the write mode or not is checked by the following method. A file table entry 220 having the file ID 221 same as the first file ID is searched (156), and a token table entry 230 having the token ID 231 same as the token ID 225 of the first file table entry is searched from the token table 123 (157). It is then checked whether the mode 223 of the first token table entry is the write mode. If the conversion originating film ID 224 of the first file table entry is "empty", the first file is the conversion originating file, and if not, the first file is the conversion destination file (156).

If Y at Step 501, Step 502 and following Steps are executed. Specifically, a current time is loaded in the time stamp 223 of the first file table entry (156). If N at Step 501, the control is passed to Step 503.

Next, the token is released (Step 503). Specifically, "empty" is loaded in the file ID 232 and mode 233 of the first token table entry (157).

Lastly, at Step 504, the remaining file close operation is performed. In this operation, release of a write buffer on the main memory, write of the file contents in the secondary storage unit 11, and other operations are performed in some cases. However, these operations are well known and not directly relevant to the features of the present invention, and so the description thereof will not further given.

After the completion of the above close API, the file system 100 notifies a completion of the close API to the application which called the close API (151, 153).

In the first embodiment as described above, the file system is provided with a correspondence (either in one step or in multi-step) between conversion destination and originating files and conversion programs stored mainly in the conversion table 120. Accordingly, a user is not necessary to instruct to convert which file into what file each time the file conversion is performed.

In the first embodiment, the operation (which may be an open API, close API, read API, or write API) the application essentially performs for file read/write is used as a trigger for the format conversion. Accordingly, the format conversion method of the first embodiment can always know the operation of the application from the file system, and execute the corresponding operation. Furthermore, although the application does not recognize at all the operation of the format conversion method, necessary conversion required by a user task is sequentially executed.

Still further, in the first embodiment, the latest contents of a conversion originating file are reflected upon the conversion destination file by using mainly the token table 123 and time stamp 223. Even if an application requests file read/write at the same time to the conversion originating file and conversion destination file, the file consistency between the conversion originating file and conversion destination file can be retained by controlling the file read/write.

(3) Deletion of Conversion Destination File

If the empty area of the second storage unit 11 becomes small, a conversion destination file or files 131, 131', . . . can be deleted. This operation is performed in the following manner.

The file system 100 periodically monitors an empty area of the second storage unit 11. If the amount of the empty area becomes smaller than a predetermined amount, the following process is performed for each of the deletion candidate entries 240 of the deletion candidate table 124.

A file table entry 220 having the file ID 221 same as the file ID 241 of the deletion candidate entry is searched from the file table 122 (156). A token table entry 230 having the token ID 231 same as the token ID 225 of the file table entry is searched from the token table 123 (157). If the file ID 232 of the token table entry is different from the file ID 221 of the file table entry, the main part of the file content 226 of the file table entry is made "empty", and "empty" is loaded to the time stamp 223 (156).

With the above process, if the empty area of the secondary storage unit 11 becomes small, all the file contents of the conversion destination files presently not in use are deleted to thereby increase the empty area. Even if the file contents of a conversion destination file are deleted, when a user newly accesses this conversion destination file, the format conversion is activated without any operation by the user and the file contents of the conversion destination file can be filled in again. Accordingly, a user can proceed its task without recognizing at all the deletion of the file contents of the conversion destination file.

(4) Timing of Format Conversion

In the first embodiment, the format conversion is performed during the open API and close API processes. Instead, the format conversion may be performed at other setup timings by using API as a trigger.

For example, after the write API of a conversion originating file, the format conversion may be performed after a lapse of a predetermined time. Specifically, when an application activates the write API, the file system 100 sets a timer with T1 seconds (T1 is arbitrary) and the control is passed to the application. If the next write API is issued within T1 seconds, the timer is set again with T1 seconds. On the other hand, if the next write API is not issued in T1 seconds, the format conversion is performed. In this manner, the format conversion is suppressed while the write API is successively issued, and after a short time after the write API issue is stopped, the format conversion is performed to pass the latest contents to conversion destination files.

Further, in the first embodiment, although the format conversion is performed synchronously with an issue of the open API, it may be performed voluntarily by the file system after a short time after the close API process, similar to the write API process. In this case, the number of cases where the format conversion is not necessary when the open API is performed increases, so that the open API can be performed at high speed. Effective timings for the voluntary format conversion may be after T2 seconds after the close API (T2 is a predetermined second value), from a time S in the midnight after the ordinary work was finished (S is an arbitrary time), or a time when the CPU load of the computer 10 becomes L or smaller (L is an arbitrary CPU load index). Such voluntary format conversion is preferably performed to ensure the latest contents of a conversion destination file, by using also the format conversion using the API issue as the trigger.

Next, the whole structure of a second embodiment will be described with reference to FIG. 6. In the second embodiment, the main constituents of the first embodiment are extended to a distributed system (a computer system having two or more computers interconnected by a network) and a two-step conversion is performed.

Figure 6:
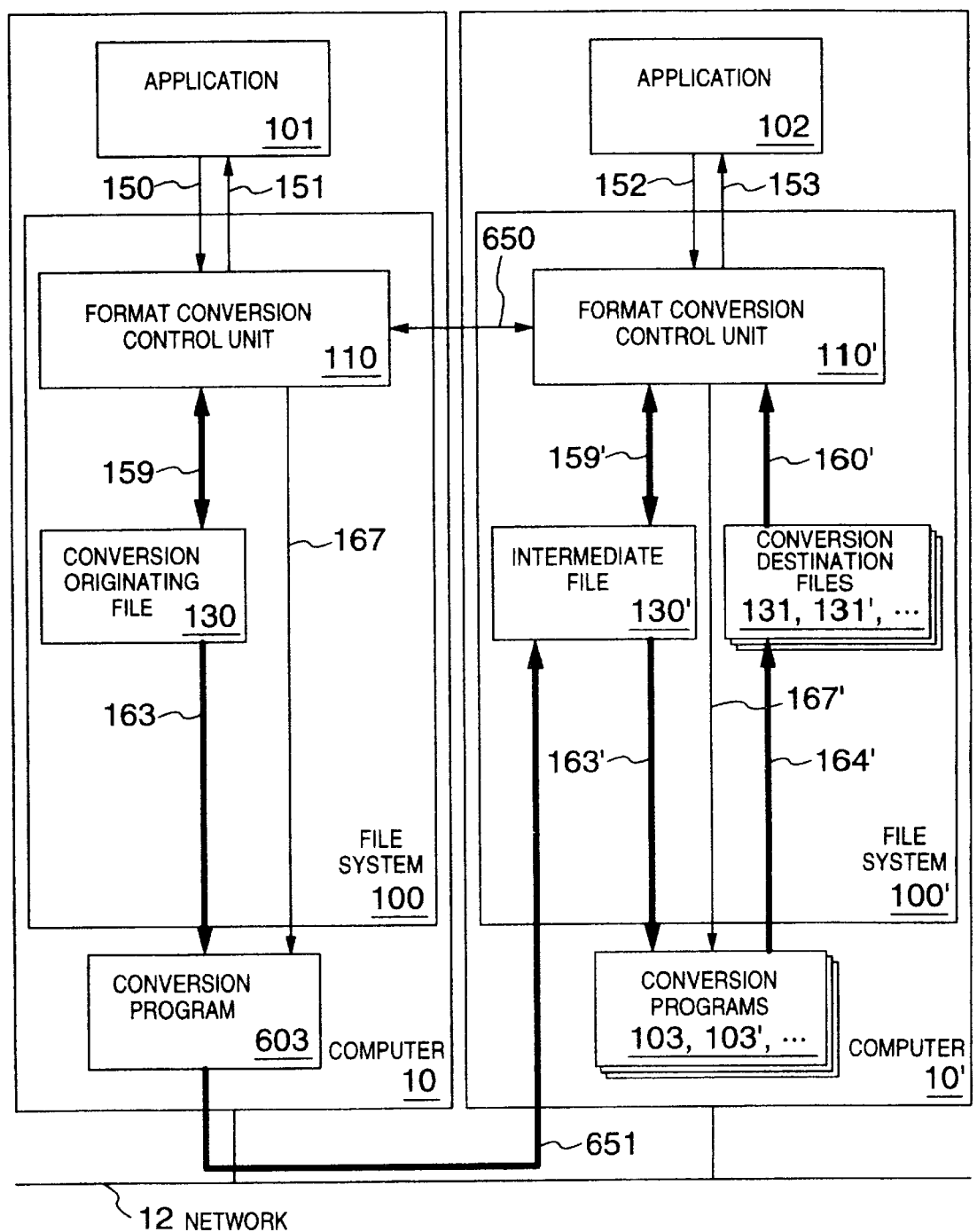
FIG. 6 is a block diagram showing the outline of the internal structure of a second embodiment.

The structure of a computer, a network, an application, a conversion program, a conversion originating file, and a conversion destination file and the numbers thereof shown in FIG. 6 are only illustrative and the invention is not limited thereto. In the structure shown in FIG. 6, two computers 10 and 10' are interconnected by a network. However, the processes executed by the second embodiment may be performed by using a single computer.

Similar to the computer 10 of the first embodiment, the computer 10 of the second embodiment may be an arbitrary computer such as a personal computer, a work station, a parallel computer, and a main frame computer. Although a secondary storage unit is not shown in FIG. 6, both the computers 10 and 10' may be provided with a secondary storage unit.

A network. 12 connects the computers 10 and 10' and other computers. The network 12 may be a LAN or a WAN (also called an intranet) often used by part or the whole of an institute (enterprise, school, similar bodies), or may be part or the whole of a WAN interconnecting a plurality of geographically distributed sites. The network 12 may also be part or the whole of the Internet which is a computer network developed first mainly in U.S.A. As the communications protocol, TCP/IP (abbreviation for Transmission Control Protocol/Internet Protocol) is mainly used. The network 12 may also be an inter-computer network or an inter-processor network of a parallel computer.

The file system 100' is software having the same function as the file system 100 of the first embodiment. The format conversion control unit 110' is software having the same function as a format conversion control unit 110. However, as will be described below, the operation of the close API is different from the first embodiment.

Each of the file systems 100 and 100' has a conversion table 120, a file table 122, a name space table 121, a token table 123, and a deletion candidate table 124 (not shown in FIG. 6).

The operation of the second embodiment will be described. The features of the second embodiment will be described by taking as an example an operation that the application 101 forms and writes a conversion originating file 130 and the application 102 reads a conversion destination file 131 converted from the conversion originating file 130.

The application 101 activates a file forming API by designating the name of a first file to be formed, to instruct the file system 100 to form the conversion originating file 130 (150). In this case, the file system 100 operates in accordance with the flow chart of the first embodiment shown in FIG. 3 and described already. The conversion originating file 130 is associated with a conversion program 603 and an intermediate file 130' as shown in FIG. 6. The format conversion control unit 110 communicates with the format conversion control unit 110' to generate the intermediate file 130' to be used during the open API process (650), and the format conversion control unit 110' generates the intermediate file 130'.

Figure 7:
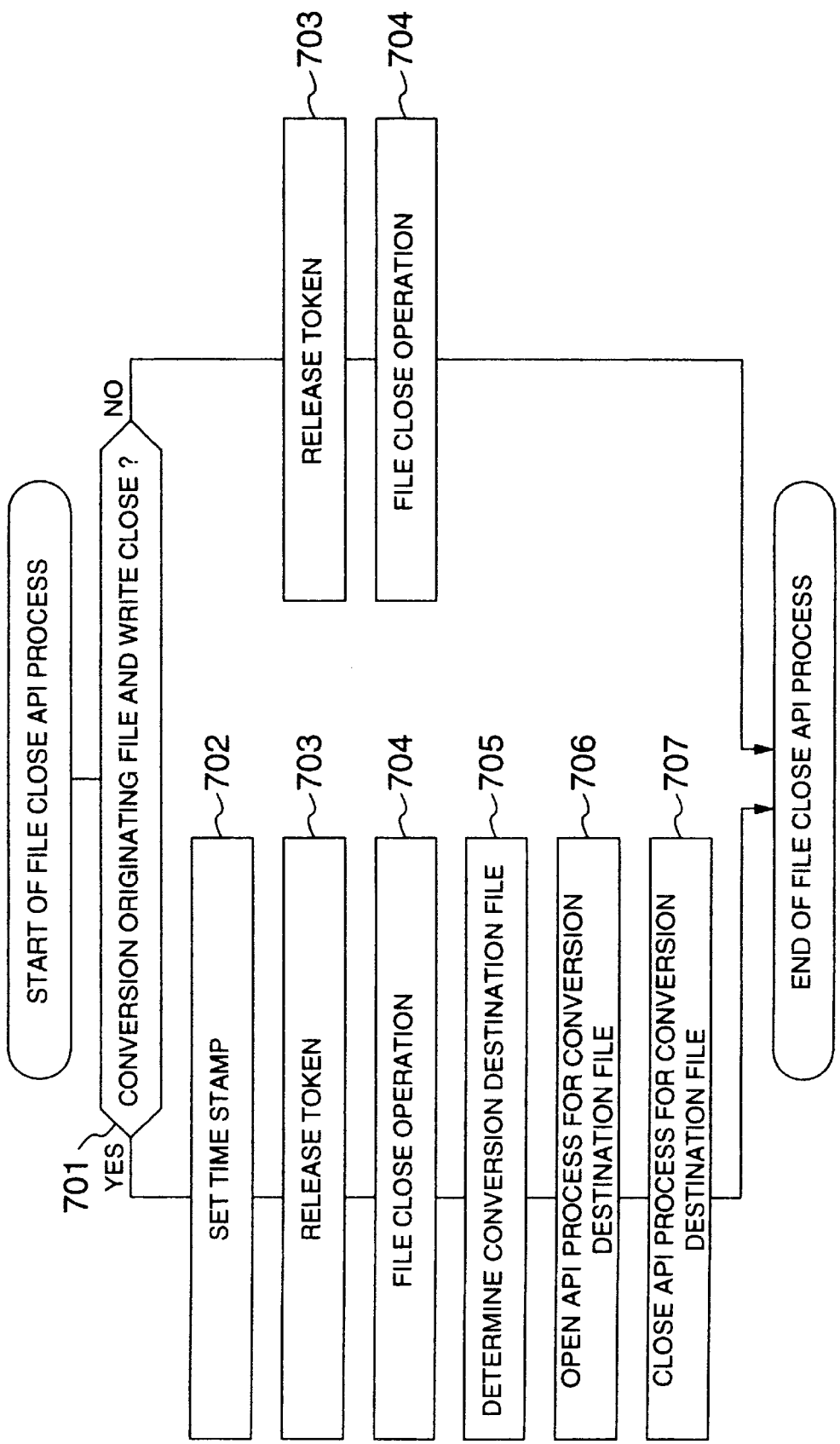
FIG. 7 is a flow chart illustrating the operation of a close API for a conversion originating file used with the second embodiment.

Next, the application system 101 instructs the file system 100 to open, write, and close the conversion originating file 130 (150). With this series of operations, the file contents of the conversion originating file 130 are stored. The open API for the conversion originating file 130 is performed in accordance with the flow chart shown in FIG. 4. The write API for the conversion originating file 130 is also performed in the similar manner to the first embodiment already described. The close API process for the application 101 is performed by the format conversion control unit 110 in accordance with the flow chart shown in FIG. 7. The process shown in FIG. 7 will be described below.

The close API for the conversion originating file 130 of the second embodiment is called from the application 101, 102 by designating the first file ID of the conversion originating file 130 opened by the open API (150). It is checked whether the open of the first file to be closed is in the write mode and whether the first file is the conversion originating file (Y) or not (N) (Step 701). Whether the open is the write mode or not is checked in the following method. The file table entry 220 having the file ID 221 same as the first file ID is searched, and the token table entry 230 having the token ID 231 same as the token ID 225 of the file table entry is searched from the token table 123. It is then checked whether the mode 233 of the first file token table entry indicates the write mode. If the conversion originating file ID 224 of the first file table entry is "empty, the first file is the conversion originating file, whereas if not "empty", the first file is the conversion destination file. If the judgement at Step 701 is Y, Steps 702 to 707 are executed, whereas if N, Steps 703 and 704 are executed.

At Step 702, a current time is loaded in the time stamp 223 of the first file table entry (156).

Next, the token is released (Step 703). Specifically, "empty" is loaded in the file ID 232 and mode 233 of the first file token table entry (157).

Next, the remaining file close operation is performed at Step 704. During this operation, release of a write buffer on the main memory, write of the file contents in the secondary storage unit 11, and other operations are performed in some cases. However, these operations are well known and not directly relevant to the aspects of the present invention, and so the description thereof will not further given.

Next, at Step 705 the conversion destination file for the first file is determined. Specifically, the file table entry 220 having the conversion originating file ID 224 same as the first file ID is searched from the file table 122. The searched file table entry is the file table entry for the conversion destination file.

Next, at Step 706 the conversion destination file is opened in the read mode. This operation is performed in the manner similar to that already described with FIG. 4.

Next, at Step 707 the first file is closed. This operation is performed in the manner similar to that already described with FIG. 5.

After the completion of the close API, the file system 100 informs a completion of the close API to the application which called the close API (151). The feature of the open API of this embodiment resides in that the conversion destination file is opened at Step 706. With this open, the latest data of the conversion originating file 103 is transferred to the intermediate file 130' under the control of the conversion program 603. In addition, with this open, the file name of the conversion destination file for the conversion originating file, i.e., intermediate file 130' is registered in the name space table 121.

Next, the application 102 instructs the file system 100' to open and read the conversion destination file 131 (152). In this case, the file system 100' performs the process of the first embodiment shown in FIG. 4 and described already. In the second embodiment, however, the conversion destination file 131 is associated with the conversion program 103 and intermediate file 130'. Therefore, in order to perform the format conversion for the open API operation for the conversion destination file 131, the intermediate file 130' is used as the input conversion destination file 131 to activate the conversion program 103.

In the operation of the second embodiment descried above, the application 101 forms and writes the conversion originating file 130, the application 102 forms and writes the conversion originating file 130, and the application 102 reads the conversion destination file 131 converted from the conversion originating file 130.

In the second embodiment, a change in the conversion originating file 130 at the computer 10 is immediately transferred to the computer 10'. Therefore, the intermediate file 130' and conversion destination files 131, 131', . . . at the computer 10' can be accessed at any time by the application, even if the power of the computer 10 is shut down or even if the secondary storage unit of the computer 10 becomes defective and the conversion originating file 130 cannot be accessed temporarily or permanently.

The feature of this embodiment is particularly effective for the case wherein the computer 10 is a personal computer or a portable computer often used by users and the computer 10' is a shared server such as a WWW server a number of users use. The reason is as follows. Even if a user turns off the power of the computer 10 or disconnects the computer 10 from the network, another user of the computer 10' can access the conversion originating file 130. Further, a user of the computer 10 can renew the conversion originating file 130 without intercepting the users of the computer 10' to access the conversion destination files 131, 131', . . . The conversion program 603 may by a copied program.

Modification 1: Conversion Designation in File Unit

In the first and second embodiments, a correspondence between a conversion originating format and a conversion destination format is referred to the conversion table 120. However, the invention is not limited to only a correspondence between formats. In the first modification, a correspondence between a conversion originating file and a conversion destination file is stored. To this end, instead of a combination of the conversion originating format 201, conversion destination format 202, and conversion program 203, a combination of a conversion originating file ID, a conversion destination file ID, and a conversion program 203 is loaded in the conversion table entry 200, and these file IDs are used when the conversion table 120 is searched during the open API or close API. The conversion table 120 of the first embodiment and the conversion table of the first modification may be mixed in one conversion table.

Modification 2: Hiding Conversion Originating File

Some user wishes the case wherein the file system hides the conversion originating file and provides only conversion destination files. For example, consider the case wherein the conversion originating file 130 has a read/write enabled format and the conversion destination files 131, 131', . . . have a read only enabled format. In this case, a user formed the conversion originating file 130 can allow other users to access only the conversion destination files 131, 131', . . . so that the conversion originating file 130 can be prevented from being changed by the third party.

In the second embodiment, a user of the computer 10' can access both the intermediate file 130' and conversion destination files 131, 131', . . . However, since the intermediate file 130' is used by the file system 100, a user becomes more easy to use the file system if the intermediate file 130' is hidden.

The function of hiding a conversion originating file (or specific conversion destination file) may be added to the first and second embodiments and the first modification. Specifically, new items (a) "hidden conversion originating flag" and (b) "hidden conversion destination list" are added to the file table 122. The item (a) is used when a conversion originating file is to be hidden, and the item (b) is used when a conversion destination file is to be hidden. If the hidden conversion originating flag is "true", the file system deletes the name of this file from the name space table 121. The hidden conversion destination list stores a list of conversion destination formats. If the conversion destination format is contained in the hidden conversion destination list for the conversion originating file, the file forming API does not add the file of the conversion destination format to the name space table 121.

Figure 8:
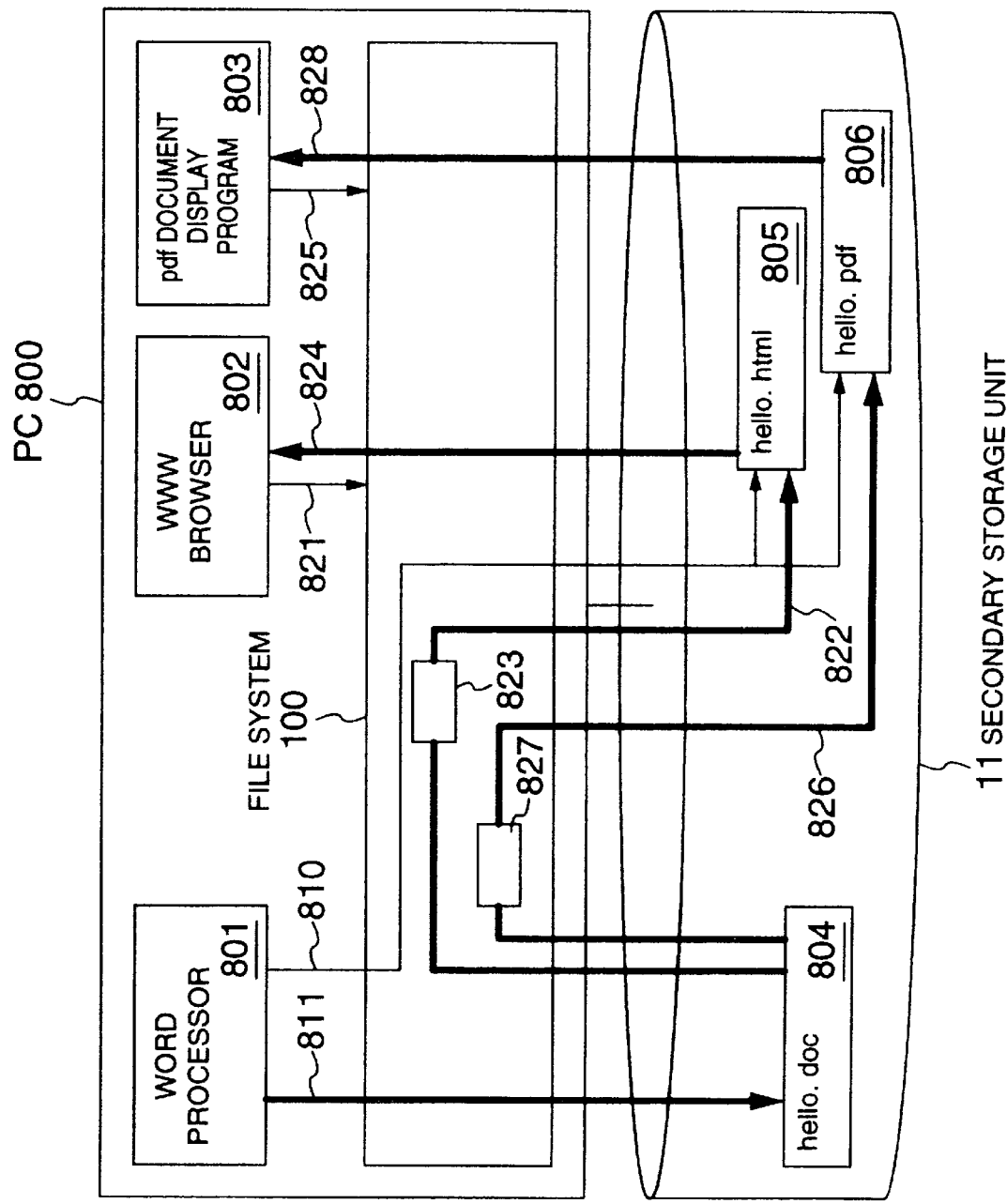
FIG. 8 is a diagram showing an application example of the invention to a personal computer.

Next, with reference to FIG. 8, an application example of the invention to a personal computer (PC) will be described. The structures of a computer and an application and the number thereof shown in FIG. 8 are only illustrative and the invention is not limited thereto.

PC 800 is a computer to be used by a user. For example, a word processor 801, a WWW browser 802, a pdf document display program 803 or the like runs on PC 800 as an application. As described earlier, the file system 100 of the invention performs necessary format conversion upon an occurrence a file operation by an application. For example, if a document formed by a user with the word processor 801, a file "hello.doc" 804, it is written in a secondary storage unit 11 (811). In this case, the file system 100 registers the file name of the conversion originating file into the name space table 121 shown in FIG. 1 (not shown in FIG. 8) in accordance with the flow chart of FIG. 3. A user can therefore process the conversion destination file (in the example shown in FIG. 8, "hello.html" 805 and "hello.pdf" 806). For example, when a user intends to access the "hello.html" 805 by using the WWW browser 802, the WWW browser 802 issues an open API for the preparation of reading the file "hello.html" 805. In this case, in accordance with the flow chart shown in FIG. 4, the file system determines a conversion program 823, and converts (822) the conversion originating file into the conversion destination file to thereby obtain the contents of the file "hello.html" 805 which is the conversion destination file converted from the conversion originating file "hello.doc" 804. With the following read API (824) for the "hello.html" 805, the WWW browser 802 can obtain the contents of the file "hello.doc" 804 as the file "hello.html" 805 having a different format. It is to be noted that during a series of above operations, a user and an application are free from the format conversion operation.

Since the invention does not depend upon an application, another application (e.g., pdf document display program 803) can read another conversion destination file without any problem. In this case, similar to the above, a conversion program 827 is determined synchronously with an issue of the open API (825) to perform the format conversion (826) from the conversion originating file "hello.doc" 804 into the conversion destination file "hello.pdf" 806. Therefore, the pdf document display program 803 can activate the read API (828) for the file "hello.pdf" 806.

Among operating systems (OS) presently used by PC, some OS realizes conventional OS functions as an aggregation of dynamic link libraries (DLL). A main part of a file system running on such an OS is made of DLL. One method of applying the invention to such a DLL-based OS is to replace a DLL providing a file system function (called FS.DLL, for example) by a DLL providing a file system of the invention (called NEW.FS.DLL). As to a portion of NEW.FS.DLL executing the same operation as a conventional file system, a function of FS.DLL is called through a function call. Therefore, the functions of the invention can be added without preparing already present functions. Namely, by superposing NEW.FS.DLL upon FS.DLL, an API call from an application conventionally received by FS.DLL can be received by NEW.FS.DLL, and if the function of FS.DLL is required, NEW.FS.DLL activates API of FS.DLL. For example, at Steps 410, 504, and 704 which call a conventional file system function, NEW.FS.DLL calls FS.DLL.

Figure 9:
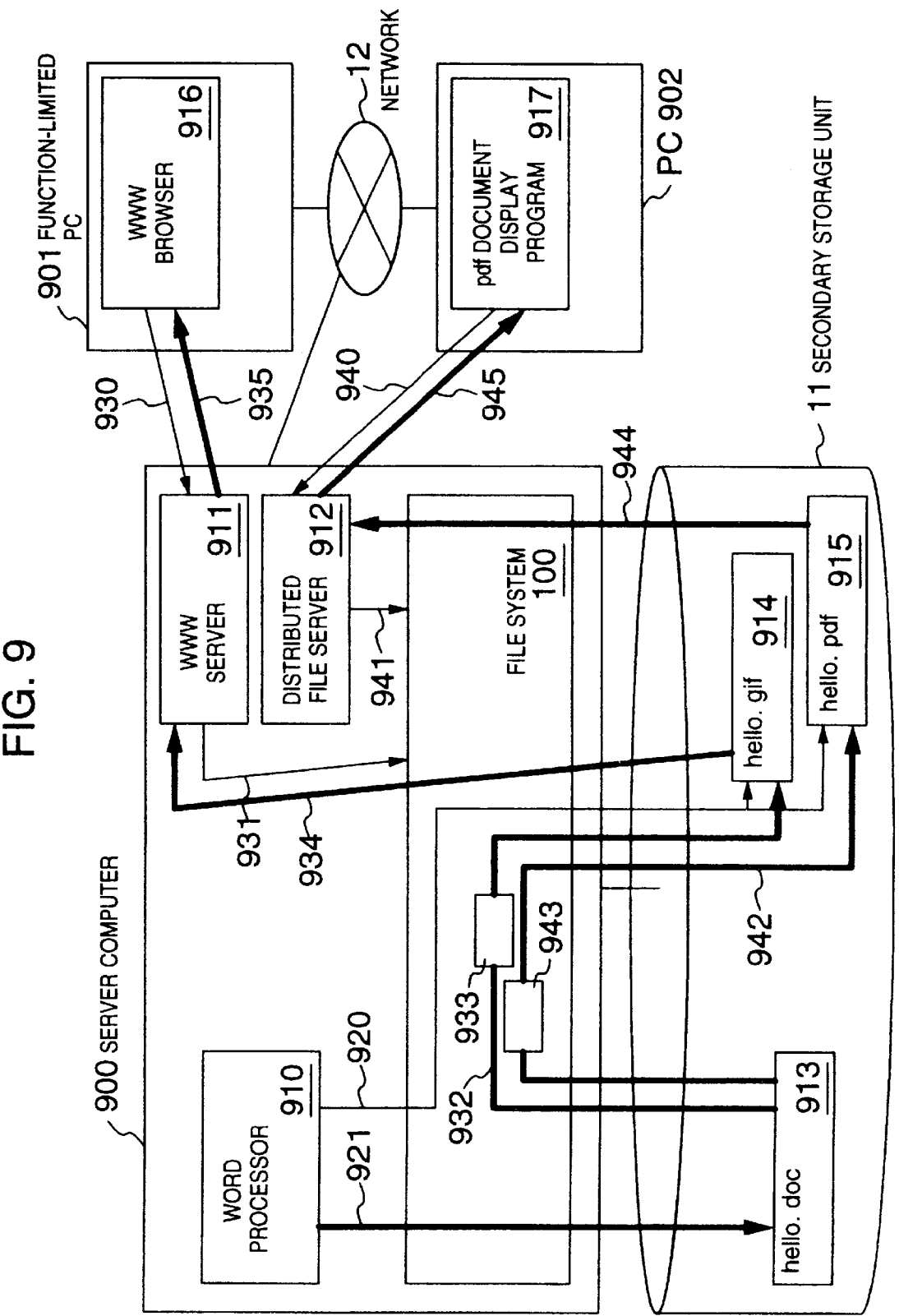
FIG. 9 is a diagram showing an application example of the invention to a WWW system.

Next, an application example of the invention to a WWW system will be described with reference to FIG. 9. As described earlier, a network 12 may be an intranet or the Internet for interconnecting computers. This application is particularly suitable for use with the WWW using TCP/IP and HTTP (abbreviation for Hyper-Text Transfer Protocol).

In this example, a server computer 900 having a file system 100 of the invention provides a function-limited PC 901 and PC 902 connected via a network with a file, by using a WWW server 911 or a distributed file server 912. The function-limited PC 901 is a network computer or a function-limited, low cost personal computer called a thin PC. Such computers are generally bundled with only necessary and minimum software in order to lower the cost. PC 902 is a general personal computer. In this example, the distributed file server 912 and file system 100 are different programs. A single program combining these programs, a so-called distributed file system, may be used. The distributed file system can be considered as the distributed file server 912 fabricated in the file system.

A user accesses a file at the server computer 900 from the function-limited PC 901 or PC 902. In this example, a user of the function-limited PC 901 accesses a file by using the WWW browser 916, and a user of PC 902 accesses a file by using the pdf document display program 917. By using the word processor 910 running on the server computer 900, a user can form a new file and change an already formed file.

If a document formed with the word processor 910 is to be stored, a user of the word processor 910 instructs the file system to form a conversion originating file "hello.doc" 913 (920) and write it in a secondary storage unit 11 (921). In this case, the file system 100 registers the file name of the conversion destination file in the name space table 121 shown in FIG. 1 (not shown in FIG. 9), in accordance with the flow chart of FIG. 3. The shared information providing software (in this example, WWW server 911 and distributed file server 912) which is one kind of application running on the server computer 900 can therefore process the conversion destination file (in the example shown in FIG. 9, "hello.gif" 914 and "hello.pdf" 915).

For example, when a user of the function-limited PC 901 refers to the image file "hello.gif" 914 by using the WWW browser 916, the WWW browser 916 sends a read request for the file hello.gif 914 to the WWW server 911 (930). Upon reception of this request, the WWW server 911 issues the open API for the preparation of reading the file "hello.gif" 914 (931). In this case, the file system 100 determines a conversion program 933 in accordance with the flow chart of FIG. 4, converts the conversion originating file into the conversion destination file (932) to thereby obtain the contents of the file "hello.gif" 914 from the file "hello.doc" 913. With the next read API (934) for the file "hello.gif" 914, the WWW browser 916 can obtain the contents of the file "hello.doc" 913 formed with the word processor as the file "hello.gif" 914 having a different format. The results are returned to the WWW browser 916 on the function-limited PC 901 (935). Since the WWW browser 916 is provided with a function of reproducing an image file, the contents of the file "hello.doc" 913 can be displayed on the function-limited PC 901. Namely, according to the invention, a user can refer to the contents of the file "hello.doc" 913 even from the function-limited PC 901 which is not provided with the word processor formed the file "hello.doc" 913.

Similarly, another user of PC 902 can read the conversion destination file by using the pdf document display program 917 without any problem. For example, in the case wherein the pdf document display program 917 reads a file "hello.pdf" 915 via the distributed file server 912, first the pdf document display program 917 sends a read request for the file "hello.pdf" 915 to the distributed file server 912 (940). Upon reception of this request, the distributed file server 912 opens the file "hello.pdf" 915 and reads it. In this case, similar to that described above, the file system 100 determines a conversion program 943 synchronously with the issue of the open API (941), and converts the file "hello.doc" 913 into the file "hello.pdf" 915 (942). With the next read API (944) for the file "hello.pdf" 915, the distributed file server 912 can return the results to the pdf document display program 917 (945).

As above, the invention is effective also for a distributed computer system including a function-limited PC.

Figure 10:
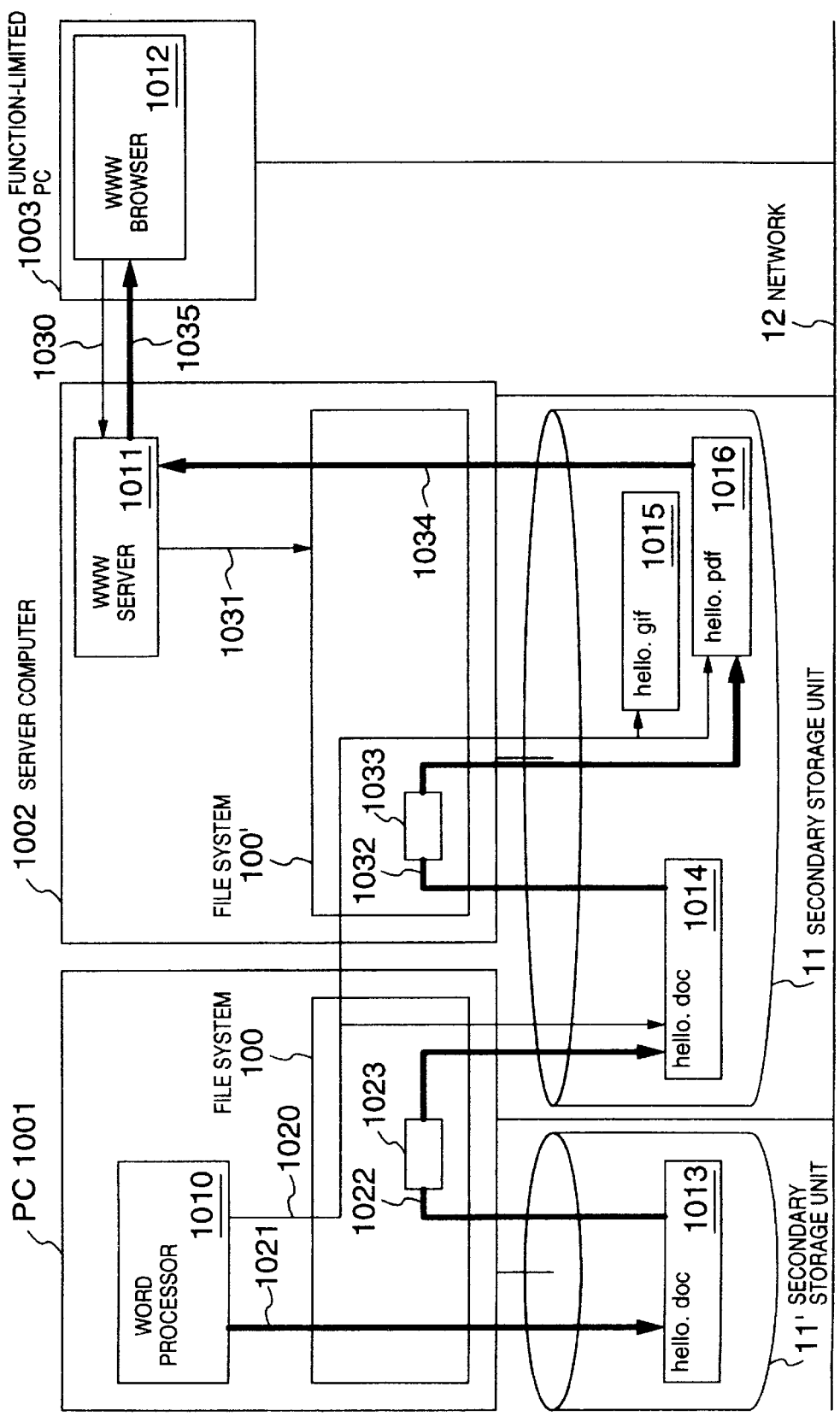
FIG. 10 is a diagram showing another application example of the invention to a WWW system.

As another application of the invention to the WWW system, an example of a distributed computer system having a WWW server, a PC and a thin PC will be described with reference to FIG. 10. The structures of a computer and an application and the number thereof are only illustrative and the invention is not limited thereto.

A user of PC 1001 forms a document with a word processor 1010. In this example, a file "hello.doc" 1013 is formed (1020), written in a secondary storage unit 11' (1021), and after a write completion, a close operation is performed. When the file "hello.doc" 1013 is formed, the file system 100 forms an intermediate file "hell.doc'" 1014 which is the conversion destination file of "hello.doc" 1013. Files "hello.pdf" 1015 and "hello.gif" 1016 are recursively formed in accordance with the flow chart shown in FIG. 4. In the last close operation, the file system 100 opens the conversion destination file, i.e., intermediate file "hello.doc'" 1014, and performs the close operation, in accordance with the flow chart shown in FIG. 7. A conversion program 1023 therefore converts the file "hello.doc" 1013 into the file "hello.doc'" 1014 (102).

As a user of a function-limited PC 1003 issues an access request for a file "hello.gif" 1016 to a WWW server 1011, by using the WWW browser 1012 (1030), the WWW server

1011 received the access request issues the open API for reading the file "hello.gif" 1016 (1013). In this open API operation, a file system 100' converts the file "hello.doc'" 1014 into the file "hello.gif" 1016 by using a conversion program 1033 (1032). Therefore, with the read API for the file "hello.gif" 1016 issued next by the WWW server 1011, the latest information obtained from the file "hello.doc'" 1014, i.e., "hello.doc" 1013 is passed via the WWW server 1011 (1034) to the user (1035).

The server computer 1002 is generally used by a number of users so that it runs 24 hours a day. PC 1001 is a computer used by one user so that its power is generally turned on and off frequently. Even if the file "hello.doc" 1013 cannot be accessed because the power of PC 1001 is turned off or because of other reasons, a user of the function-limited PC 1003 can access the files "hello.gif" 1016, "hello.pdf" 1015, and "hello.doc'" 1014 because of the format conversion function of the invention via the intermediate file "hello.doc'" 1014.

Figure 11:
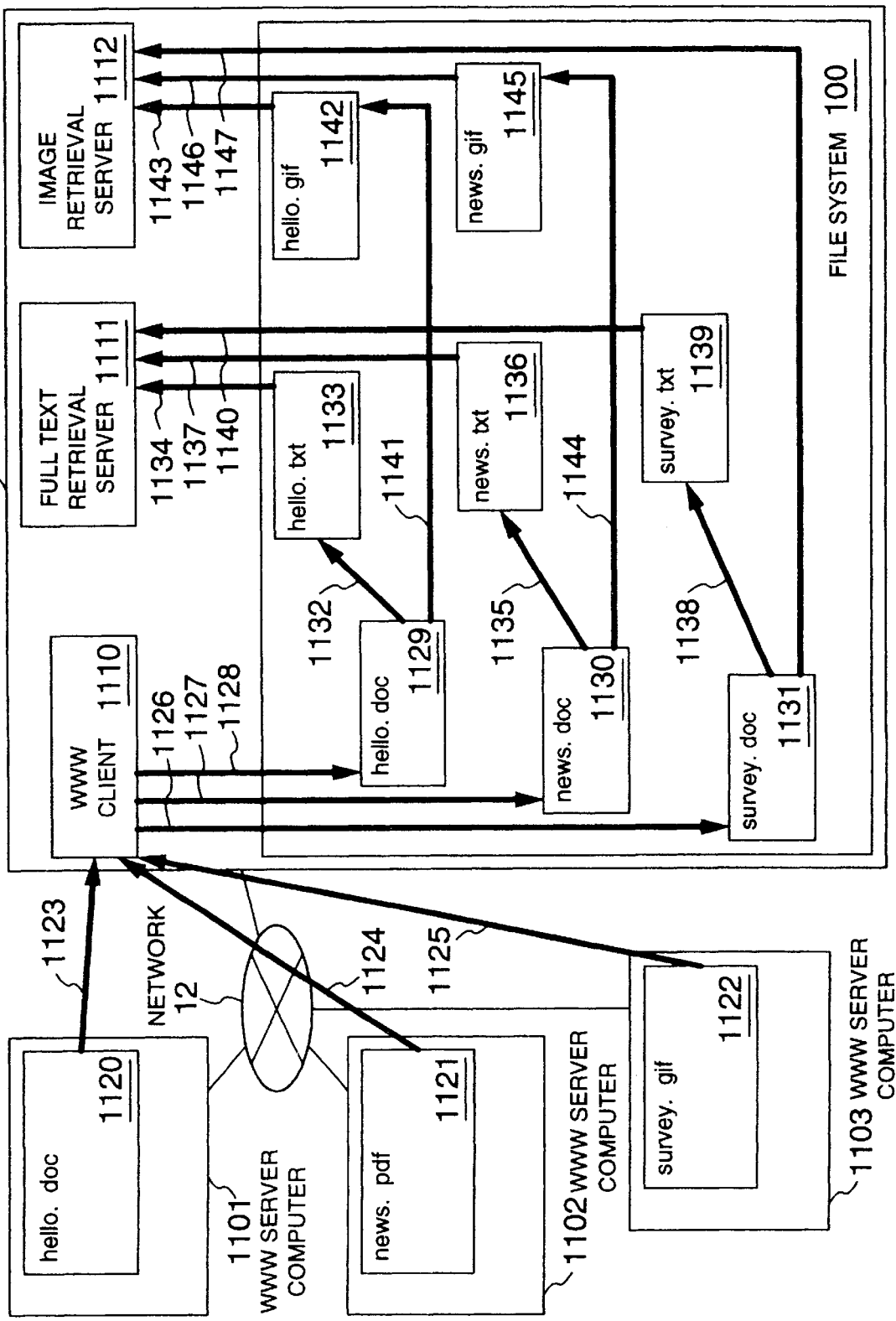
FIG. 11 is a diagram showing another application example of the invention to a distributed retrieval system.

An application example of the invention to a distributed information retrieval system in an intra-enterprise information system will be described with reference to FIG. 11.

A user retrieves desired information of a particular field from WWW server computers 1101,1102, 1103, ... providing information at various sites inside and outside of an enterprise. A retrieval program running on a retrieval server computer 1100 retrieves desired information. In this example, the retrieval server computer includes a full text retrieval server 1111 and an image retrieval server 1112. The full text retrieval server 111 retrieves a character string, and the image retrieval server 1112 retrieves an image through pattern matching. Other retrievals such as voice pattern retrieval and data base retrieval may be additionally used. The WWW server computers 1101, 1102, 1103, ... and retrieval server computer 1100 are interconnected by a network 12. The network 12 may be an intra-enterprise network (intranet), a network interconnecting enterprises, or a network interconnecting the whole world such as the Internet.

The intra- and inter-enterprise WWW server computers generally provide information having various formats. The retrieval server computer 1100 with the file system 100 of this invention can solve the differences between various formats without imposing a load on an application. In the example shown in FIG. 11, the WWW server computer 1101 provides a file hello.doc 1120, the WWW server computer 1102 provides a file "news.pdf" 1121, and the WWW server computer 1103 provides a file "survey.gif" 1122. These files are collected by a WWW client 1110 running on the retrieval server computer 1100 (1123, 1124, 1125), and stored in the file system 100 (1126, 1127, 1128). The file system 100 may be provided with a secondary storage unit which is omitted in FIG. 11.

The full text retrieval server 1111 is input with a character format file ".txt". Therefore, in response to a file operation API issued by the full text retrieval server 1111 for files "hello.txt" 1133, "news.txt" 1136, "survey.txt" 1139, the file system 100 converts the file "hello.doc" 1129 into "hello.txt" 1133, the file "news.pdf" 1130 into "news.txt" 1136, and the file "survey.gif" 1131 into "survey.txt" 1139, by using corresponding conversion programs (not shown in FIG. 11) (1132, 1135,1138). Therefore, the full text retrieval server 1111 can retrieve information having a different format from that used by the full text retrieval server 1111 (1134, 1137, 1140), and can process without considering that the retrieved information has different formats (i.e., specific programming is not required for the full text retrieval server 1111). A user can access the conversion originating file ("hello.doc" 1129, "news.pdf" 1130, survey.gif 1131) having a variety amount of information, by checking the retrieval results. Also in this case, the file system 100 can convert the conversion originating file into a file having a format usable by a user to thereby provide the user with convenience.

If the information is converted into image information, quite a different retrieval for the same information can be performed. The image retrieval server 1112 is input with an image format file ".gif". Therefore, in response to a file operation API issued by the image retrieval server 1112 for files "hello.gif" 1142, "news.gif" 1145, "survey.gif" 1131, the file system 100 converts the file "hello.doc" 1129 into "hello.gif" 1142 and the file "news.pdf" 1130 into "news.gif" 1145, by using corresponding conversion programs (not shown in FIG. 11) (1141, 1144). Therefore, the image retrieval server 11121 can retrieve information of the conversion originating files (1129, 1130, 1131) having a different format from that used by the image retrieval server 1112 (1143, 1146, 1147), and can process without considering that the retrieved information has different formats.

Figure 12:
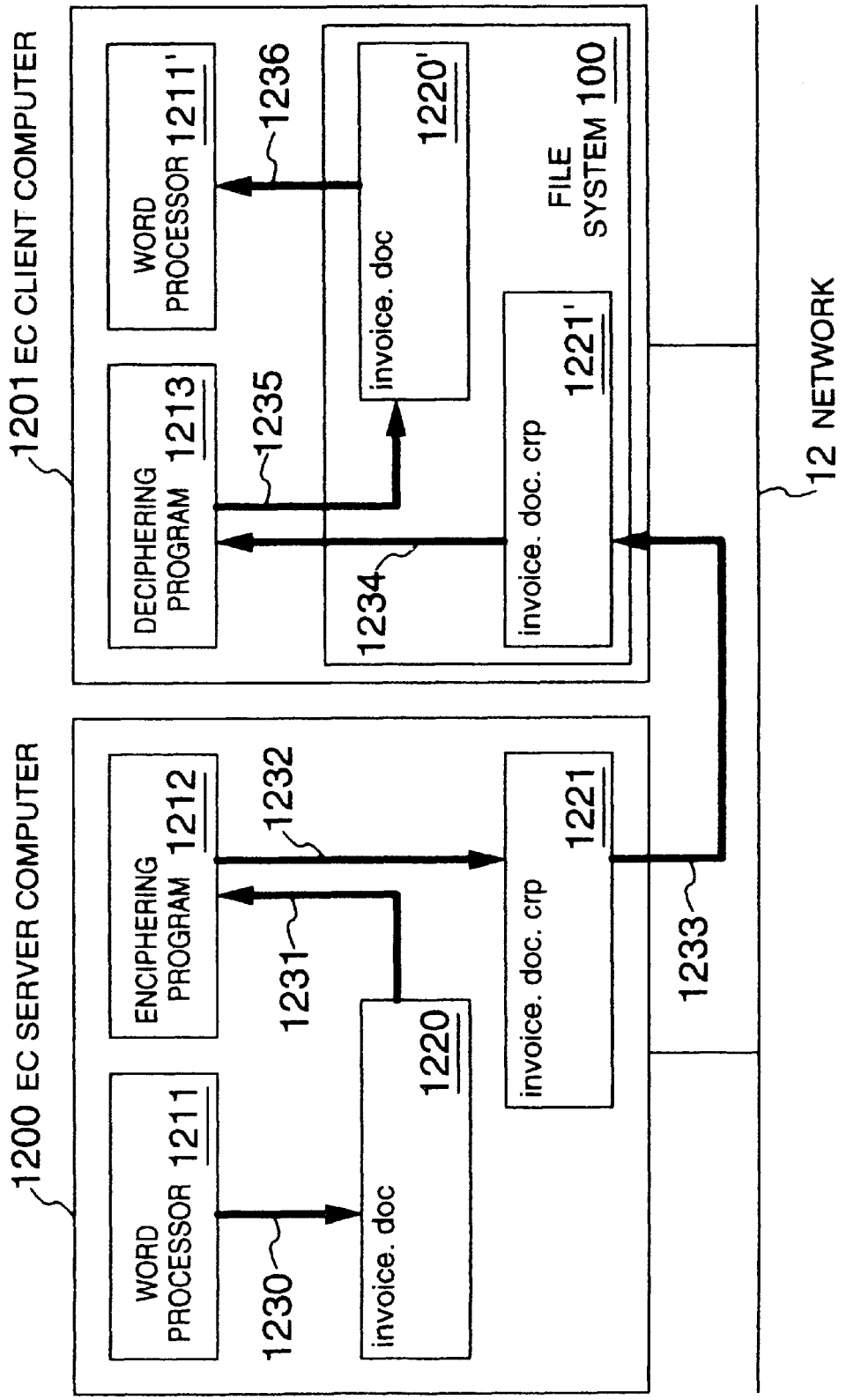
FIG. 12 is a diagram showing an application example of the invention to an electronic commerce system.

Lastly, an application example of the invention to an electronic commerce (EC) system for electronically dealing with transactions between enterprises or between individual persons and enterprises will be described with reference to FIG. 12.

In EC over the Internet, an invoice is sent from a first user to a second user via many enterprise or institute networks. In this case, the invoice enciphered is often sent in order to protect the privacy of the first and second users and to prevent illegal alternation of the invoice by a third party.

An EC server computer 1200 communicates with an EC client computer 1201 to perform an EC transaction. A first user of the EC server computer 1200 forms an invoice of an order made by a second user of the EC client computer 1201, and the second user receives the invoice. This case will be described below. Enciphering (or deciphering) in such a situation may be considered as one kind of format conversion. The conversion program for this is an enciphering program and a deciphering program.

The first user forms a file "invoice.doc" 1220 with a word processor 1211 (1230), the file "invoice.doc" being an invoice for orders made by the second user in the past. A enciphering program 1212 enciphers the file "invoice.doc" 1220 (1231), and the enciphered file "invoice.doc.crp" 1221 is sent to the second user by an e-mail (or a file added to an e-mail). The second user stores the received e-mail in the file system as a file "invoice.doc.crp" 1221'. In this case, the file system of this invention uses a deciphering program 1213 as the conversion program and converts the format of the conversion originating file "invoice.doc.crp" 1221' (1234), and supplies the second user with a conversion destination file "invoice.doc" 1220' (1235). In this manner, the second user can refer to the invoice by using a word processor 1211' without any work of manually deciphering the "invoice.doc" 1220' (1236). Although not described in this example, the invention is applicable also to the case where the second user enciphers an invoice. Both the first and second users can perform EC comfortably at high speed and without considering enciphering and deciphering an invoice.

As described so far, a user performs only a task regarding an application, without taking into consideration various necessary format conversions (either one-step or multi-step). During the user task, it is not necessary to designate a conversion originating file and a timing of format conversion. A user can use always a latest conversion destination file. A consistency between a conversion originating file and a conversion destination file can be retained. A wasteful area of a secondary storage unit to be caused by storing a number of conversion destination files can be avoided. The format conversion is possible even if the conversion originating file cannot be used.

What is claimed is:

1. A file format conversion method of converting a first file having a first format into second files $F_1, F_2, \ldots F_m$ (m: an integer of 1 or larger) having second formats different from the first format by using conversion programs $P_1, P_2, \ldots P_m$, the method comprising the steps of:

(1) determining a correspondence between the first file, the conversion program, and the second file to be converted by the conversion program;

(2) designating the first or second file by an application of a user; and (3) converting the first format of the first file into the second format of the second file by using the corresponded conversion program, by using as a trigger at least one timing among a timing of a file operation of the first or second file issued by the application of the user, a predetermined timing, and a timing when predetermined conditions are satisfied.

2. A file format conversion method according to claim 1, wherein said correspondence determining step (1) includes a method of obtaining two of the first file, a first conversion program, and the second file obtained from the first file by the first conversion program, in accordance with either the first or second file.

3. A file format conversion method according to claim 2, wherein said correspondence determining step uses a table storing a correspondence among the first file, the first conversion program, and the second file.

4. A file format conversion method according to claim 2, wherein said correspondence determining step uses a program having a correspondence among the first file, the first conversion program, and the second file.

5. A file format conversion method according to claim 1, wherein the file operation includes a close operation after a write operation of the first file, and a read/write operation or an open operation for read/write for the second file.

6. A file format conversion method according to claim 1, wherein a third file is provided which is different from the first and second files, a format of the third file is converted into the format of the first file when the format of the first file is converted into the format of the second file.

7. A file format conversion method according to claim 1, wherein one of the first and second files is an e-mail or a file attached to the e-mail.

8. A file format conversion method according to claim 1, wherein contents is a part or the whole of the second files obtained by format conversion are deleted without deleting file names.

9. A recording medium storing as a program the file format conversion method according to claim 1.

10. A server computer having a secondary storage unit for storing a plurality of files, the server computer comprising an application having a file editing function, a display program for displaying a document of a format among one or more formats, and a file system with the file format conversion method for converting the format of the conversion originating file into the format of the conversion destination file as recited in claim 1, wherein the application forms the conversion originating file in accordance with an operation by a user and stores the conversion originating file in the secondary storage unit;

a WWW server is interconnected via a network to a function-limited personal computer (PC) receives a file read request from the program ported to the function-limited PC and issues an open application program interface (API), and synchronously with the issue, the file system reads contents of the conversion destination file converted from the conversion originating file and returns the contents to the program; and a distributed file server is coupled via the network to a program for displaying or editing a document of one format among conversion file destination formats, receives a read request for the conversion destination file from the program, and issues an open API, and synchronously with the issue, the file system reads contents of a conversion destination file converted from the conversion origination file and returns the contents to the program.

11. A retrieval server computer having a secondary storage unit for storing a plurality of files, the retrieval server computer comprising a WWW client, at least one retrieval server, and a file system with the file format conversion method for converting the format of the conversion originating file into the format of the conversion destination file as recited in claim 1, wherein the WWW client is interconnected via a network to a plurality of WWW server computers each storing files of different formats, collects contents of each file, and stores the contents in the file system as the conversion originating file; and the retrieval server is provided in correspondence with a type of information to be retrieved, and a retrieval server corresponding to the type of information retrieves information from conversion destination files of a same format converted from conversion originating files of different formats by the file system.

12. A retrieval server computer according to claim 11, wherein the retrieval server is provided with a first retrieval program receiving a first format and a second retrieval program receiving a second format, and the file system converts a format of the information into the first and second formats and supplied the first and second formats to the first and second retrieval programs.

13. A file format conversion method according to claim 1, wherein contents is a part or the whole of the second files obtained by format conversion are deleted without deleting file names.

14. A recording medium storing as a program the file format conversion method according to claim 1.

15. A file format conversion method for providing a user with a first file and one or more second files obtained through format conversion of the first file, wherein the number of operations to be executed at the same time is only one of a first file operation for the first file and a second file operation for a third file which is one of the second file.

16. A file format conversion method according to claim 15, wherein one of the first and second file operations is either a write operation or an open operation in a write mode.

17. A file system for a computer system provided with a secondary storage unit for storing a plurality of files, the file system comprising: a conversion originating file; a conversion destination file after format conversion; a correspondence designating unit for determining a correspondence between the conversion originating file, a conversion program, and the conversion destination file; an application program interface (API) for defining a file operation executable by an application program; and a format conversion control unit for executing a desired format conversion in response to an activation of API.

18. A file system according to claim 17 wherein said correspondence designating unit includes an interface for registering or deleting a corresponded item.

19. A file system according to claim 17, wherein said correspondence designating unit includes an interface for registering or deleting a corresponded item.

20. A file system for each of a plurality of computer systems of a distributed system interconnected via a network, each computer system being provided with a secondary storage unit for storing a plurality of files, the file system comprising: a file including at least one of a conversion originating file and a conversion destination file after format conversion; a correspondence designating unit for determining a correspondence between the conversion originating file, a conversion program, and the conversion destination file; an application program interface (API) for defining a file operation executable by an application program; and a format conversion control unit for executing a desired format conversion in response to an activation of API during communications with another file system over the network.

21. An information processing system including a first personal computer (PC) having a file editing function and being capable of turning a power on/off, a world wide web (WWW) server computer with a power maintained on, and a second personal computer (PC) without a file conversion function, wherein:

PC includes a conversion originating file of a predetermined format and a control unit having an internal conversion program for controlling format conversion by the internal conversion program in accordance with an instruction form a user issued via an application program interface (API) for defining a file operation executable by an application program;

the WWW server computer includes an intermediate file obtained through the format conversion by PC, at least one conversion destination file obtained through the format conversion of the intermediate file by using at least one conversion program, and a format conversion control unit for controlling the format conversion in accordance with the instruction of the user issued via API; and PC has a function of designating via a WWW browser at last one conversion destination file in the WWW server computer and instructing the WWW server computer to read contends of the conversion destination file.

22. A personal computer having a secondary storage unit for storing a plurality of files, the personal computer comprising an application having a file editing function, a display program for displaying a document of a format among one or more formats, and a file system with the file format conversion method for converting the format of the conversion originating file into the format of the conversion destination file as recited in claim 1, wherein the application forms the conversion originating file in accordance with an operation by a user and stores the conversion originating file in the secondary storage unit; and the display program issues an open API, and synchronously with the issue, reads and displays contents of another conversion destination file converted from the conversion originating file by the file system.

* * * * *